United States Patent
Asao

(10) Patent No.: US 9,906,146 B2
(45) Date of Patent: Feb. 27, 2018

(54) THERMAL PROTECTION CIRCUIT FOR SWITCHING POWER SUPPLY

(71) Applicant: Onkyo Corporation, Osaka (JP)

(72) Inventor: Kei Asao, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 15/488,556

(22) Filed: Apr. 17, 2017

(65) Prior Publication Data
US 2017/0302187 A1 Oct. 19, 2017

(30) Foreign Application Priority Data
Apr. 18, 2016 (JP) .................................. 2016-082563

(51) Int. Cl.
*H02M 3/335* (2006.01)
*H02M 1/32* (2007.01)

(52) U.S. Cl.
CPC .......... *H02M 3/33523* (2013.01); *H02M 1/32* (2013.01)

(58) Field of Classification Search
CPC ..................... H02M 3/335–3/42; H02M 1/32
See application file for complete search history.

(56) References Cited

U.S. PATENT DOCUMENTS

| 2015/0085540 A1* | 3/2015 | Huang | H02H 5/042 |
| | | | 363/56.11 |
| 2016/0072399 A1* | 3/2016 | Kikuchi | H02M 3/33592 |
| | | | 363/21.14 |

FOREIGN PATENT DOCUMENTS

| JP | 2009-130975 | 6/2011 |
| JP | 3485200 B2 | 1/2013 |

* cited by examiner

*Primary Examiner* — Gary L Laxton
*Assistant Examiner* — Peter Novak
(74) *Attorney, Agent, or Firm* — Renner Otto Boisselle & Sklar, LLP

(57) ABSTRACT

To operate a switching power supply again automatically (automatic return) after the switching power supply is stopped for protection.
A protection circuit 6 includes a bipolar transistor Q1 that becomes ON state and sets current that flows to a photo coupler 62 larger in case that a temperature detection element 63 supplies a detection signal, a control IC 4 that controls a switching element 3, and a protection power supply circuit 66 that includes a condenser C3 that is charged by output voltage from the switching power supply 1. Power supply voltage form the protection power supply circuit 66 is supplied to the temperature detection circuit 63 and the photo coupler 62. Further, in case that voltage value that is changed by the photo coupler 62 is not more than a predetermined value, the control IC 4 stops the switching element 3.

7 Claims, 1 Drawing Sheet

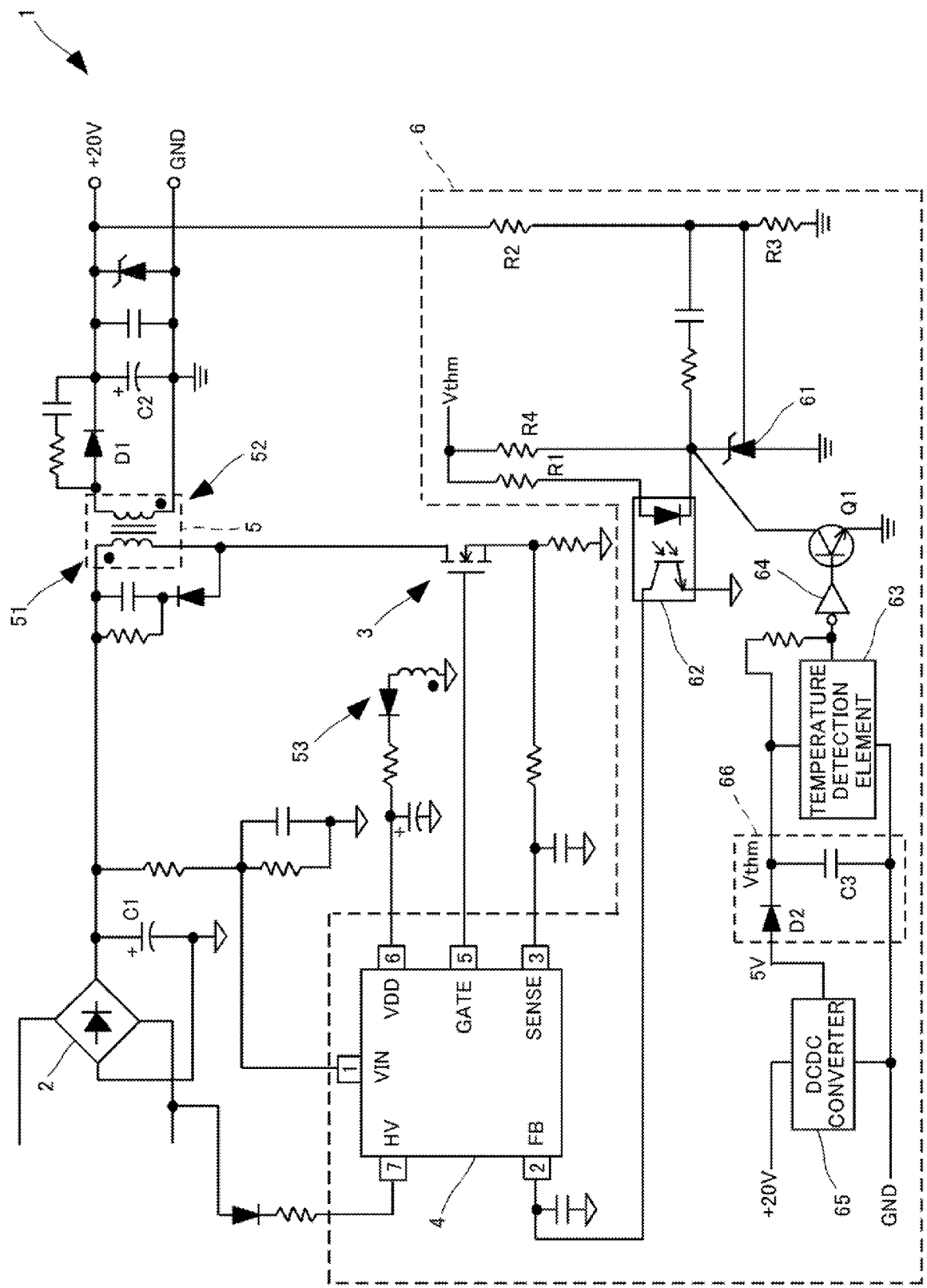

THERMAL PROTECTION CIRCUIT FOR SWITCHING POWER SUPPLY

BACKGROUND OF THE INVENTION

1. Field of the Invention

The present invention relates to a protection circuit for protecting a switching power supply from heat and the switching power supply.

2. Description of the Related Art

In case that a switching power supply is used in a small sealing type active speaker, the following problems are given. For example, maximum output of the above mentioned small sealing type active speaker is 60 W. Further, the small sealing type active speaker is adaptive to network function and operated by an external controller.
(1) In case that a transformer is downsized, radiation ability of the transformer drops by size factor and temperature rises.
(2) Inside temperature rising of a sealing enclosure of small capacity becomes high because of a small sealing enclosure. In case that temperature of a coil of a transformer reaches 120° C. by (1) and (2), coated varnish melts and there is a possibility of fault by short circuit, smoke, and fire. For this reason, temperature protection function of the transformer is needed.

Conventional circuit system of temperature protection of the transformer is classified to the following two.
A. a circuit that a temperature fuse is used (for example, see JP 3485200 B)
B. a circuit that a semiconductor is used (for example, see JP 2009-130975 A)
In case of A, when the temperature fuse reaches a predetermined temperature, it cuts and the transformer is protected. In case of B, a temperature detection element, a diode, and a comparator are used. When temperature that the temperature detection element detects reaches a predetermined temperature, switching is stopped by a control IC of primary side.

In a speaker that is adaptive to network function, in case that conventional temperature protection function is applied, the following problem is given.
(3) A physical switch does not exist because the speaker is controlled via network. When power stops (latch up), basic operation such as activation of a system is not performed.

The problem of abovementioned (3) exists. For this reason, in case that the switching power supply is used in a speaker that is controlled via network and does not include a physical switch, it is necessary to automatically operate the switching power supply again (automatic return) after the switching power supply is stopped for protection from heat. In case of above mentioned A, the temperature fuse cuts. For this reason, automatic return cannot be performed. In case of above mentioned B, automatic return can be performed. However, output of the switching power supply is used in a protection circuit that is for protecting the switching power supply. For this reason, there is a problem that protection operation is released quickly when the switching power supply stops.

SUMMARY OF THE INVENTION

An objective of the present invention is to operate a switching power supply again automatically (automatic return) after the switching power supply is stopped for protection.

A protection circuit comprising: a temperature detection element that supplies a detection signal at a temperature not less than a predetermined temperature; a feedback element; a voltage detection element that is connected to the feedback element at the secondary side of a switching power supply and changes current that flows to the feedback element based on output voltage of the switching power supply; a switch that is connected to the feedback element at the secondary side of the switching power supply, becomes ON state, and sets current that flows to the feedback element larger in case that the temperature detection element supplies the detection signal; a control circuit that is connected to the feedback element at the primary side of the switching power supply and controls a switching element that the switching power supply includes; and a protection power supply circuit that includes a charge element that is charged by output voltage from the switching power supply, wherein power supply voltage is supplied from the protection power supply circuit to the temperature detection element and the feedback element, and the control circuit stops the switching element in case that voltage that is changed by the feedback element is not more than a predetermined value.

In the present invention, in case that temperature that a temperature detection element detects becomes not less than a predetermined temperature, a switch is turned ON and large current flows to a feedback element. For this reason, voltage that is changed by the feedback element becomes not more than a predetermined value, and a control circuit stops a switching element. Namely, the switching power supply is stopped and protection operation is performed.

Further, after operation of the switching power supply stops, output voltage of the switching power supply drops. Current that flows to the feedback element becomes small. Voltage that is changed by the feedback element becomes larger than a predetermined value. The control circuit tries to operate the switching element (switching). Herein, power supply voltage from a protection power supply circuit is supplied to the temperature detection element and the feedback element. The protection power supply circuit can supply power supply voltage to the temperature detection element and the feedback element after stop of the switching power supply because it includes a charge element that is charged by output voltage of the switching power supply. For this reason, if temperature that the temperature detection element detects does not drop less than a predetermined temperature after the switching power supply is stopped, protection operation is continuously performed. Meanwhile, temperature that the temperature detection element detects drops less than the predetermined temperature, protection operation ends and the control circuit operates the switching element (switching). Therefore, after the switching power supply stops operation, a problem that the switching power supply operates immediately after the stop is prevented from occurring.

Like this, according to the present invention, after the switching power supply is stopped for protection, the switching power supply can be operated again automatically (automatic return).

Preferably, further comprising: a buffer, wherein the temperature detection element supplies a low level signal as the detection signal, the buffer inverts the low level signal supplied from the temperature detection element into a high level signal, the switch is an npn type bipolar transistor, a base of the bipolar transistor is connected to the buffer, a collector of the bipolar transistor is connected to the feedback element, and an emitter of the bipolar transistor is earth potential.

In the present invention, the switch is an npn type bipolar transistor. A base of the bipolar transistor is connected to a buffer. A collector of the bipolar transistor is connected to the feedback element. An emitter of the bipolar transistor is connected to earth potential. For this reason, when the temperature detection element outputs a low level signal, the buffer supplies a high level signal to the base of the bipolar transistor, and then the bipolar transistor becomes ON state. Therefore, when temperature that the temperature detection element detects becomes not less than the predetermined temperature, the switch becomes ON state and large current can flow to the feedback element.

Preferably, wherein the feedback element is a photo coupler that includes alight emitting diode and a phototransistor, power supply voltage from the protection power supply circuit is supplied to an anode of the light emitting diode via a first resistor, a cathode of the light emitting diode is connected to the voltage detection element and the switch, a collector of the phototransistor is connected to a feedback terminal of the control circuit, and an emitter of the phototransistor is connected to earth potential.

In the present invention, a cathode of a light emitting diode is connected to a voltage detection element. For this reason, current based on output voltage of the switching power supply flows to the light emitting diode. Further, current based on current that flows to the light emitting diode flows to a phototransistor. Further, a collector of the phototransistor is connected to the feedback terminal of the control circuit. For this reason, the control circuit can control the switching element based on voltage of the feedback terminal that is changed by the phototransistor.

Further, the cathode of the light emitting diode is also connected to the switch. For this reason, when the switch becomes ON state, large current flows to the light emitting diode. Further, large current flows to the phototransistor because current based on current that flows to the light emitting diode flows to the phototransistor. Further, the collector of the phototransistor is connected to the feedback terminal of the control circuit. For this reason, voltage of the feedback terminal becomes not more than a predetermined value and the control circuit stops the switching element. Namely, protection operation is performed. In case that temperature that the temperature detection element becomes not less than a predetermined temperature, protection operation can be performed.

Preferably, further comprising: a voltage dropping circuit drops output voltage from the switching power supply, wherein the protection power supply circuit further includes a diode that is connected to the voltage dropping circuit, and the charge element is charged by voltage that is supplied from the voltage dropping circuit via the diode.

Preferably, further comprising; a second resistor in which one end is connected to output of the switching power supply and the other end is connected to a third resistor; and the third resistor in which one end is connected to the other end of the second resistor and the other end is connected to earth potential, wherein the voltage detection circuit is a shunt regulator, a reference terminal of the shunt regulator is connected between the second resistor and the third resistor, a cathode of the shunt regulator is connected to the feedback element, and an anode of the shunt regulator is connected to earth potential.

In the present invention, the voltage detection element is a shunt regulator. A reference terminal of the shunt regulator is connected between a second resistor and a third resistor that are connected between output of the switching power supply and earth potential. Further, a cathode of the shunt regulator is connected to the feedback element. Further, an anode of the shunt regulator is connected to the earth potential. For this reason, the shunt regulator increases and decreases cathode suction current based on divided voltage by the second resistor and the third resistor of the output voltage of the switching power supply. Therefore, current that flows the feedback element increases and decreases base on cathode suction current. Thus, current that flows to the feedback element can be increased and decreased based on output voltage of the switching power supply.

Preferably, wherein the temperature detection element is provided near a transformer that the switching power supply includes.

In the present invention, the temperature detection element is provided near a transformer that the switching power supply includes. For this reason, the transformer can be protected from heat (temperature rising).

A switching power supply comprising the protection circuit.

According to the present invention, after the switching power supply is stopped for protection, the switching power supply can be operated again automatically (automatic return).

BRIEF DESCRIPTION OF THE DRAWINGS

FIG. 1 is a diagram illustrating a circuit configuration of a switching power supply according to an embodiment of the present invention.

DETAILED DESCRIPTION OF THE PREFERRED EMBODIMENTS (Switching Power Supply)

An embodiment of the present invention is described below. FIG. 1 is a diagram illustrating a circuit configuration of a switching power supply according to an embodiment of the present invention. The switching power supply 1 includes a rectifier circuit 2, a condenser C1, a switching element 3, a control IC 4, a transformer 5, a diode D1, a condenser C2, and a protection circuit 6.

The rectifier circuit 2 rectifies AC voltage that is input from an AC power supply. The condenser C1 smooths voltage that the rectifier circuit 2 rectifies. Smoothed voltage is supplied to the switching element 3. The control IC 4 (control circuit) controls the switching element 3. A power supply terminal VDD of the control IC 4 is connected to an auxiliary coil 53 of the transformer 5. The control IC 4 operates by power supply voltage that voltage output from the auxiliary coil 53 is rectified. The switching element 3 is controlled by the control IC 4. The switching element 3 supplies AC voltage of optional frequency to a primary coil 51 of the transformer 5 by switching with optional frequency. For example, the switching element 3 is an n type MOSFET. The switching element 3 supplies voltage from the condenser C1 or voltage of the earth potential to the primary coil 51. The transformer 5 transforms voltage that is supplied to the primary coil 51 and outputs transformed voltage from the secondary coil 52. The diode D1 rectifies AC voltage from the secondary coil 52. The condenser C2 smooths voltage that the diode D1 rectifies. The voltage that the condenser C2 smooths is output voltage of the switching power supply 1.

(Protection Circuit)

As illustrated in FIG. 1, the protection circuit 6 includes a shunt regulator 61, resistors R1 to R4, a photo coupler 62, the control IC 4, a temperature detection element 63, a buffer 64, a bipolar transistor Q1, a DCDC convertor 65, and a protection power supply circuit 66.

The shunt regulator 61 (voltage detection element) is connected to the photo coupler 62 at the secondary side of the switching power supply 1. Further, the shunt regulator 61 changes current that flows to the photo coupler 62 based on output voltage of the switching power supply 1. A reference terminal of the shunt regulator 61 is connected between the resistor R2 (second resistor) and the resistor R3 (third resistor). A cathode of the shunt regulator 61 is connected to the photo coupler 62 (a cathode of a light emitting diode). An anode of the shunt regulator 61 is connected to the earth potential.

The photo coupler 62 (feedback element) includes the light emitting diode and a phototransistor. Power supply voltage Vthm from the protection power supply circuit 66 is supplied to an anode of the light emitting diode via a resistor R1 (first resistor). The cathode of the light emitting diode is connected to the shunt regulator 61 and the bipolar transistor Q1. A collector of the phototransistor is connected to a feedback terminal FB of the control IC 4. An emitter of the phototransistor is connected to the earth potential. The power supply voltage Vthm from the protection power supply circuit 66 is supplied to one end of the resistor R4. The other end of the resistor R4 is connected to the shunt regulator 61 and the bipolar transistor Q1. The control IC 4 is connected to the photo coupler 62 at the primary side of the switching power supply 1.

The temperature detection element 63 detects temperature and supplies a detection signal in case that detected temperature is not less than a predetermined temperature (for example, 100° C.). Output of the temperature detection element 63 is open drain at a temperature less than the predetermined temperature. Output of the temperature detection circuit 63 is low level at a temperature not less than predetermined temperature. Therefore, the temperature detection element 63 supplies a low level signal as the detection signal. The temperature detection element 63 is provided near the transformer 5. Therefore, the temperature detection element 63 detects temperature near the transformer 5 and supplies the detection signal based on detected temperature near the transformer 5.

The buffer 64 inverts the low level signal into a high level signal. The bipolar transistor Q1 (switch) is an npn type bipolar transistor. The bipolar transistor Q1 is connected to the photo coupler 62 at the secondary side of the switching power supply 1. The bipolar transistor Q1 sets current that flows to the photo coupler 62 larger by becoming ON state. A base of the bipolar transistor Q1 is connected to the buffer 64. A collector of the bipolar transistor Q1 is connected to the photo coupler 62 (the cathode of the light emitting diode). An emitter of the bipolar transistor Q1 is connected to the earth potential.

The DCDC convertor 65 (voltage dropping circuit) drops output voltage from the switching power supply 1. For example, the DCDC convertor 65 drops output voltage +20V from the switching power supply 1 to 5V. The protection power supply circuit 66 includes a diode D2 and a condenser C3 (charge element). The condenser C3 is charged by voltage that is supplied from the DCDC convertor 65 via the diode D2. The power supply voltage Vthm (charge voltage of the condenser C3) is supplied from the protection power supply circuit 66 to the temperature detection element 63 and the photo coupler 62. In FIG. 1, symbols that illustrate the earth potential (GND) are different at the primary side and at the secondary side of the switching power supply 1 because the primary side and the secondary side are insulated by the photo coupler 62.

Operation of the protection circuit 6 is described below. The shunt regulator 61 increases and decreases suction current of the cathode based on divided voltage that is input to the reference terminal, of output voltage from the switching power supply 1 by the resistor R2 and the resistor R3. The divided voltage is input to the reference terminal of the shunt regulator 61. The higher voltage of the reference terminal is, the more the shunt regulator 61 increases suction current of the cathode. Further, the lower voltage of the reference terminal is, the more the shunt regulator 61 decreases suction current of the cathode.

In the photo coupler 62, current of the light emitting diode increases and decreases based on increase and decrease of suction current of the shunt regulator 61. Current of the phototransistor increases and decreases based on increase and decrease of current of the light emitting diode. Increase and decrease of current of the phototransistor changes voltage of the feedback terminal FB of the control IC 4. Herein, not shown, power supply is connected to the feedback terminal FB of the control IC 4 via a resistor. For this reason, the more current of the phototransistor increases, the more voltage of the feedback terminal FB decreases. The control IC 4 changes duty of ON/OFF by the switching element 3 so as to adjust output voltage of the switching power supply 1 according to the voltage of the feedback terminal FB.

Herein, in case that detected temperature becomes not less than the predetermined temperature, the temperature detection element 63 supplies the low level signal as the detection signal. The buffer 64 inverts the low level signal that the temperature detection element 63 supplies. The bipolar transistor Q1 becomes ON state because the base of the bipolar transistor Q1 is connected to the buffer 64. Large current flows to the light emitting diode because the collector of the bipolar transistor Q1 is connected to the cathode of the light emitting diode. Further, large current flows to the phototransistor. For this reason, voltage of the feedback terminal FB of the control IC 4 drops greatly, and it becomes not more than the predetermined value. In case that voltage of the feedback terminal FB is not more than the predetermined value, the control IC 4 stops the switching element 3. Like this, at a temperature not less than the predetermined temperature, the protection circuit 6 stops operation of the switching power supply 1 and performs protection operation to protect the transformer 5 (the switching supply 1) from heat.

After operation of the switching power supply 1 stops, output voltage of the switching power supply 1 drops, and cathode suction current of the shunt regulator 61 decreases. For this reason, current that flows to the light emitting diode decreases. Further, current that flows to the phototransistor decreases. Thus, voltage of the feedback terminal FB of the control IC 4 becomes larger than the predetermined value and the control IC 4 tries to operate the switching element 3.

Herein, the power supply voltage Vthm from the protection power supply circuit 66 is supplied to the temperature detection element 63 and the photo coupler 62. The protection power supply circuit 66 can supply power supply voltage to the temperature detection element 63 and the photo coupler 62 after stop of operation of the switching power supply 1 because it includes the condenser C3 that is charged by output voltage of the switching power supply 1. For this reason, if temperature does not drop to be less than the predetermined temperature after operation of the switching power supply 1 stops, the bipolar transistor Q1 is ON state, and the protection circuit 6 performs protection operation. Meanwhile, when temperature drops to be less than the predetermined temperature, the bipolar transistor Q1 becomes OFF state, and the protection circuit 6 ends protection operation. When the protection circuit 6 ends protection operation, the control IC 4 operates the switching element 3 (switching).

As described above, in the present embodiment, in case that temperature that the temperature detection element 63 detects becomes not less than the predetermined temperature, the bipolar transistor Q1 is turned ON and large current flows to the photo coupler 62. For this reason, voltage that is changed by the photo coupler 62 becomes not more than the predetermined value, and the control IC 4 stops the switching element 3. Namely, the switching power supply 1 is stopped and protection operation is performed.

Further, after operation of the switching power 1 supply stops, output voltage of the switching power supply 1 drops. Current that flows to the photo coupler 62 becomes small. Voltage that is changed by the photo coupler 62 becomes larger than the predetermined value. The control IC 4 tries to operate the switching element 3 (switching). Herein, power supply voltage from the protection power supply circuit 66 is supplied to the temperature detection element 63 and the photo coupler 62. The protection power supply circuit 66 can supply power supply voltage to the temperature detection element 63 and the photo coupler 62 after stop of the switching power supply 1 because it includes the condenser C3 that is charged by output voltage of the switching power supply 1. For this reason, if temperature that the temperature detection element 63 detects does not drop to be less than the predetermined temperature after stop of the switching power supply 1, protection operation is performed. Meanwhile, temperature that the temperature detection element 63 detects drops to be less than the predetermined temperature, protection operation ends and the control IC 4 operates the switching element 3 (switching). Therefore, after the switching power supply 1 stops operation, that a problem that the switching power supply 1 operates immediately after the stop is prevented from occurring.

Like this, according to the present embodiment, after the switching power supply 1 is stopped for protection, the switching power supply 1 can be operated again automatically (automatic return).

Further, in the present embodiment, the base of the npn type bipolar transistor Q1 is connected to the buffer 64. The collector of the bipolar transistor Q1 is connected to the photo coupler 62 (the cathode of the light emitting diode). The emitter of the bipolar transistor Q1 is connected to the earth potential. For this reason, the temperature detection element 63 outputs the low level signal. The buffer 64 supplies the high level signal to the base of the bipolar transistor Q1, then the bipolar transistor Q1 becomes ON state. Therefore, when temperature that the temperature detection element 63 detects becomes not less than the predetermined temperature, the bipolar transistor Q1 becomes ON state and large current can flow to the photo coupler 62.

Further, in the present embodiment, the cathode of the light emitting diode is connected to the cathode of the shut regulator 61. For this reason, current based on output voltage of the switching power supply 1 flows to the light emitting diode. Further, current based on current that flows to the light emitting diode flows to the phototransistor. Further, the collector of the phototransistor is connected to the feedback terminal FB of the control IC 4. For this reason, the control IC 4 can control the switching element 3 based on voltage of the feedback terminal FB that is changed by the phototransistor.

Further, the cathode of the light emitting diode is also connected to the collector of the bipolar transistor Q1. For this reason, when the bipolar transistor Q1 becomes ON state, large current flows to the light emitting diode. Further, large current flows to the phototransistor because current based on current that flows to the light emitting diode flows to the phototransistor. Further, the collector of the phototransistor is connected to the feedback terminal FB of the control IC 4. For this reason, voltage of the feedback terminal FB becomes not more than the predetermined value and the control IC 4 stops the switching element 3. Namely, protection operation is performed. In this manner, in case that temperature that the temperature detection element 63 becomes not less than a predetermined temperature, protection operation can be performed.

Further, in the present embodiment, the reference terminal of the shunt regulator 61 is connected to between the resistor R2 and the resistor R3 that are connected between output of the switching power supply 1 and the earth potential. Further, the cathode of the shunt regulator 61 is connected to the cathode of the light emitting diode. Further, the anode of the shunt regulator 61 is connected to the earth potential. For this reason, the shunt regulator 61 increases and decreases cathode suction current based on divided voltage of the output voltage of the switching power supply 1, divided by the resistor R2 and the resistor R3. Therefore, current that flows to the light emitting diode and the phototransistor increases and decreases based on cathode suction current. Thus, current that flows to the photo coupler 62 can be increased and decreased based on output voltage of the switching power supply 1.

Further, in the present embodiment, the temperature detection element 63 is provided near the transformer 5 that the switching power supply 1 includes. For this reason, the transformer 5 can be protected from heat (temperature rising).

The embodiment of the present invention is described above, but the mode to which the present invention is applicable is not limited to the above embodiment and can be suitably varied without departing from the scope of the present invention as will be described below.

In the above mentioned embodiment, the temperature detection element 63 is provided near the transformer 5. Not limited to this, the temperature detection element 63 may be provided at the other position.

The present invention can be suitably employed in a protection circuit for protecting a switching power supply from heat and the switching power supply.

What is claimed is:
1. A protection circuit comprising: a temperature detection element that supplies a detection signal at a temperature not less than a predetermined temperature;
   a feedback element;
   a voltage detection element that is connected to the feedback element at the secondary side of a switching power supply and changes current that flows to the feedback element along a current path based on output voltage of the switching power supply;
   a switch that is connected to the feedback element at the secondary side of the switching power supply, becomes ON state, and sets current that flows to the feedback element along the same current path larger in case that the temperature detection element supplies the detection signal;

a control circuit that is connected to the feedback element at the primary side of the switching power supply and controls a switching element that the switching power supply includes; and a protection power supply circuit that includes a charge element that is charged by output voltage from the switching power supply, wherein power supply voltage is supplied from the protection power supply circuit to the temperature detection element and the feedback element, and the control circuit stops the switching element in case that voltage that is changed by the feedback element is not more than a predetermined value.

2. The protection circuit according to claim 1, further comprising: a buffer, wherein the temperature detection element supplies a low level signal as the detection signal, the buffer inverts the low level signal supplied from the temperature detection element into a high level signal, the switch is an npn type bipolar transistor, a base of the bipolar transistor is connected to the buffer, a collector of the bipolar transistor is connected to the feedback element, and an emitter of the bipolar transistor is earth potential.

3. The protection circuit according to claim 1, wherein the feedback element is a photo coupler that includes a light emitting diode and a phototransistor, power supply voltage from the protection power supply circuit is supplied to an anode of the light emitting diode via a first resistor, a cathode of the light emitting diode is connected to the voltage detection element and the switch, a collector of the phototransistor is connected to a feedback terminal of the control circuit, and an emitter of the phototransistor is connected to earth potential.

4. The protection circuit according to claim 1, further comprising: a voltage dropping circuit drops output voltage from the switching power supply, wherein the protection power supply circuit further includes a diode that is connected to the voltage dropping circuit, and the charge element is charged by voltage that is supplied from the voltage dropping circuit via the diode.

5. The protection circuit according to claim 1, further comprising; a second resistor in which one end is connected to output of the switching power supply and the other end is connected to a third resistor; and the third resistor in which one end is connected to the other end of the second resistor and the other end is connected to earth potential, wherein the voltage detection circuit is a shunt regulator, a reference terminal of the shunt regulator is connected between the second resistor and the third resistor, a cathode of the shunt regulator is connected to the feedback element, and an anode of the shunt regulator is connected to earth potential.

6. The protection circuit according to claim 1, wherein the temperature detection element is provided near a transformer that the switching power supply includes.

7. A switching power supply comprising the protection circuit according to claim 1.

* * * * *